(12) United States Patent
Yananton

(10) Patent No.: US 7,654,227 B1
(45) Date of Patent: Feb. 2, 2010

(54) ABSORBENT PAD FOR ENTRAPPING SMALL AND LARGE PARTICLES, RETAINING LIQUIDS AND ELIMINATING ODORS

(76) Inventor: Pat Yananton, 1598 Oak Glen Rd., Toms River, NJ (US) 08753

( * ) Notice: Subject to any disclaimer, the term of this patent is extended or adjusted under 35 U.S.C. 154(b) by 71 days.

(21) Appl. No.: 10/745,147

(22) Filed: Dec. 23, 2003

Related U.S. Application Data

(63) Continuation-in-part of application No. 10/033,862, filed on Dec. 20, 2001.

(51) Int. Cl.
*A01K 29/00* (2006.01)
(52) U.S. Cl. ...................................................... 119/169
(58) Field of Classification Search ................. 119/159, 119/161–173; 15/208–233; 428/37, 85, 428/90, 91, 92, 95, 317.9, 320.2; 604/359, 604/360, 365, 367; 442/43–47, 59, 60, 63, 442/77, 84, 96
See application file for complete search history.

(56) References Cited

U.S. PATENT DOCUMENTS

| | | | |
|---|---|---|---|
| 3,658,578 A | | 4/1972 | Bennett |
| 3,717,897 A | | 2/1973 | Amos et al. |
| 3,752,121 A | * | 8/1973 | Brazzell ...................... 119/169 |
| 4,774,907 A | | 10/1988 | Yananton |
| 4,800,677 A | | 1/1989 | Mack |
| 4,861,632 A | | 8/1989 | Caggiano |
| 4,913,954 A | | 4/1990 | Mack |
| 4,963,431 A | | 10/1990 | Goldstein et al. |
| 5,173,346 A | | 12/1992 | Middleton |
| 5,338,340 A | * | 8/1994 | Kasmark et al. ............... 96/135 |
| RE34,951 E | * | 5/1995 | Slosberg et al. ............... 428/95 |
| 5,431,643 A | | 7/1995 | Ouellette et al. |
| 5,482,007 A | * | 1/1996 | Kumlin ...................... 119/169 |
| 5,819,688 A | * | 10/1998 | Walker ...................... 119/169 |
| 5,834,104 A | | 11/1998 | Cordani |
| 5,846,603 A | | 12/1998 | Miller |
| 5,961,763 A | | 10/1999 | Makoui et al. |
| 5,965,376 A | * | 10/1999 | Beausang et al. .......... 435/7.21 |
| 6,050,223 A | * | 4/2000 | Harris ........................ 119/165 |
| 6,129,978 A | | 10/2000 | Caldwell |
| 6,219,876 B1 | | 4/2001 | Blum |
| 6,386,143 B1 | * | 5/2002 | Link et al. ................... 119/165 |

(Continued)

OTHER PUBLICATIONS

Aimone, James, Challenges and Opportunities for Designing and Manufacturing Molded and Needled Automotive Products, pp. 869-874.

(Continued)

*Primary Examiner*—Thomas Price
(74) *Attorney, Agent, or Firm*—John D. Gugliotta, PE, Esq.

(57) ABSTRACT

A layered pad comprising a bottom impervious layer, a top layer of a fibrous high loft non woven capable of entrapping small or large particles and preventing their scatter, optionally combined with a middle layer of fibers and super absorbent agent, wherein liquids pass through the top layer, become absorbed by the middle layer, and evaporate; and a method for manufacturing a non-woven pad layer having an at least partially open-ended configuration. The method of manufacturing the open-ended non-woven layer includes cutting at least one surface of the non-woven layer and then abrading the cut surface with an abrading tool.

10 Claims, 2 Drawing Sheets

U.S. PATENT DOCUMENTS

| | | | |
|---|---|---|---|
| 6,458,442 B1 | 10/2002 | McKay | |
| 6,468,623 B1 * | 10/2002 | Higgins | 428/95 |
| 6,569,274 B1 | 5/2003 | Makoui et al. | |
| 6,569,494 B1 | 5/2003 | Chambers et al. | |
| 6,746,974 B1 | 6/2004 | Reiterer et al. | |

OTHER PUBLICATIONS

Allen, Jr., H. Charles, The Cotton Fiber Process and Fiber Characteristics, pp. 7-34.
Akers, Paul, Differentiating Superabsorbent Fibers, pp. 119-126.
Angelini, Peter J., Fiber to Web Process—Wet Lay, pp. 567-579.
Gilmore, Thomas F., Protecting Nonwoven Creativity: The Importance of Patents, pp. 890-897, College of Textiles, North Carolina State University.
Arulf, Sandra S., The Polyester Fiber Process and Fiber Characteristics, pp. 59-69.
Bakra, S.K. et al., Neither Woven Nor Knit: A New System For Classifying Textiles, pp. 515-523, North Carolina State University.
Behery, Hassan M. et al., Effect of Production Variables on Properties of Ultrasonically Bonded Nonwovens, pp. 657-674.
Blam, A.F. et al., A New Class of Fire Retarding Latexes for Nonwovens, pp. 305-320.
Bodaghi, Ph.D., Hassan, Melt Blown Microfiber Characterization, pp. 441-477.
Bouchillon, Randall E., Bicomponent Fibers Worldwide, pp. 149-159.
Brandon, R.E. et al., Utilization of Glass Fibers in Nonwoven Fabrics, pp. 179-190.
Britton Ph.D., Peter N., Spunlace Processes Worldwide, pp. 613-627.
Calliari, Mark J., Basics of Nonwovens: Converting Processes, pp. 855-867, Green Bay, Wisconsin.
Chou, Lee-Pei H. et al., A Novel Method to Determine the Binder Level In Nonwoven Webs, pp. 413-433.
Cluthe, Dr. Charles E. et al., Rhedlogy Modification of Coatings for Converting Nonwoven Fabrics, pp. 335-366.
Cooke, Theodore F., Superabsorbent Fibers, pp. 99-117.
Davies, Barrie L., New Developments in Bicomponent Fibers, pp. 127-148.
Ettekoven, H. Van et al., Double-Sided Printing, Finishing and Coating with the Screen-to-Screen Technology, pp. 735-744.
Foster, John H., Needlepunching Past, Present, and Future, pp. 681-702.
Gill, R.A. et al., Design of Acrylic Resin Binders for Medical Nonwoven Applications, pp. 367-375.
Goldstein Ph.D., Joel E. et al., Nonwoven Applications for Polyvinyl Alchohol, pp. 271-283.
Goodchild, William C., Compressive Treatment Technology, pp. 757-762.
Hansen, William L., Converting and Product Development Considerations for Pressure Sensitive Adhesive Coated Products, pp. 879-888.
Hardy, Craig, The Rayon Fibre Process and Fibre Characteristics, pp. 35-57.
Hotstetter, B.J. et al., A Monte Carlo Simulation to Predict Tensile Properties of Nonwoven Fabrics, pp. 397-412.
Humphrey, Keith et al., The Application of Image Analysis Within the Nonwovens Industry, pp. 801-824.
Jubilee, Benjamin, Acrylics and Acrylic Copolymer Materials, pp. 197-203.
Kaija, Arnold, Electrostatic and Mechanical Fiber Coating, p. 745-750.
Kelly, David G., The Balance of Strength and Softness in Saturation-Bonded Polyester Nonwovens Used for Interlinings, pp. 839-851.
Kinn, Larry L. et al., Fiber Length-Fiber Surface Area Relationships in Wet-Laid Polyester Nonwovens, pp. 763-775.
Ko, Frank K. et al., Computer Aided Design of Nonwoven Fabrics, pp. 377-396.
Ko, Frank K. et al., Structure and Properties of Carded Glass Composites, pp. 825-838.
Koltisko Ph.D, Bernard M., Vinyl Copolymer Materials, pp. 221-248.
Lochmaier, Wayne, Fiber Classifications and Definitions, pp. 1-5.
Mathews, Grace, Mechanical Finishing, pp. 751-755.
McIntosh, Bruce, Developments in Peek Fibers Opportunities in High Tech Applications, pp. 89-98.
McMeekin, Linda J. et al., Visualizing Structure in Nonwovens, pp. 785-800.
Mercer, Scott A., Innovative Adhesive Application Systems: From Simplicity to Complexity, pp. 655-656, Hendersonville, TN.
Mlynar, Michele F. et al., Processing Aids for Resin Bonded Nonwoven Webs, pp. 249-257.
Johnson, Richard H., Chemical Non-Woven Web Bonding, pp. 629-632.
Johnston, Milo, Resin to Web Process—Meltblowns, pp. 585-604.
Morgan, David J., Bicomponent Fibers, pp. 71-80.
Nelson, David L., Dry Lay Web Forming, pp. 549-566.
Narayan, Ramani, Rationale and Design of Environmentally Degradable Nonwovens, pp. 435-439, Michigan State University.
Pangrazi, Ronald, Low Formaldehyde Nonwoven Binders, pp. 263-270.
5 Parker, Roy B., Structural Properties of Needlefelts, pp. 605-612.
Powers, Mark, Fiber Spin Finish Technology, pp. 191-196.
Reed, John F., Direct Process Nonwovens: Forming Webs During Fiber Spinning, pp. 81-88.
Riedel, John E., Product Enhancers, pp. 259-262.
Riedel, John E., Nonwoven Web Forming—Fiber Overview, pp. 539-548.
Riedel, John E., Basics of Nonwovens Converting Processes, pp. 853-854.
Rogers, Randall J., Methods, Materials and Products of Thermal Bonding, pp. 633-654.
Ryle, Thomas R., Extrusion Coating and Lamination of Nonwovens, pp. 717-727.
Sabia, A.J. et al., The Effect of Various Silicone Finishes on the Tactile and Physical Properties of Nonwoven Substrates, pp. 321-333.
Scardino, Frank, Evaluation of Nonwoven Fabrics with the KES Testing Equipment, pp. 777-784, Philadelphia College of Textiles and Science.
Shortmann, Walter E., Chemical Treatments for Comfortable Barrier Fabrics, pp. 703-716.
Smorada, Dr. Ronald L., Resin to Web Process-Spunbond, pp. 581-584.
Stark, David E. et al., Foaming Equipment for Nonwovens, pp. 675-680.
Straeffer, Gregory et al, Mechanical and Structural Properties of Melt-Blown Fibers, pp. 479-513.
Stull, Jeffrey O., Converting Processes for Protective Apparel/Devices, pp. 875-877, Austin, TX.
Thompson, Del R. et al., New Fluorochemicals for Protective Clothing, pp. 285-304.
Wilkes, Dr. A.G., A New Viscose Rayon Fibre for Nonwovens, pp. 161-177.
Vandermaas, J.K. et al., Dyeing of Nonwovens, pp. 729-734.
Williams, Martin M. et al., Styrene Butadiene Latex Polymers for Nonwovens Applications, pp. 205-220.
Wadsworth, Larry C. et al., Melt Blown Processing and Characterization of Fluoropolymer Resins, pp. 525-538, The University of Tennessee.

* cited by examiner

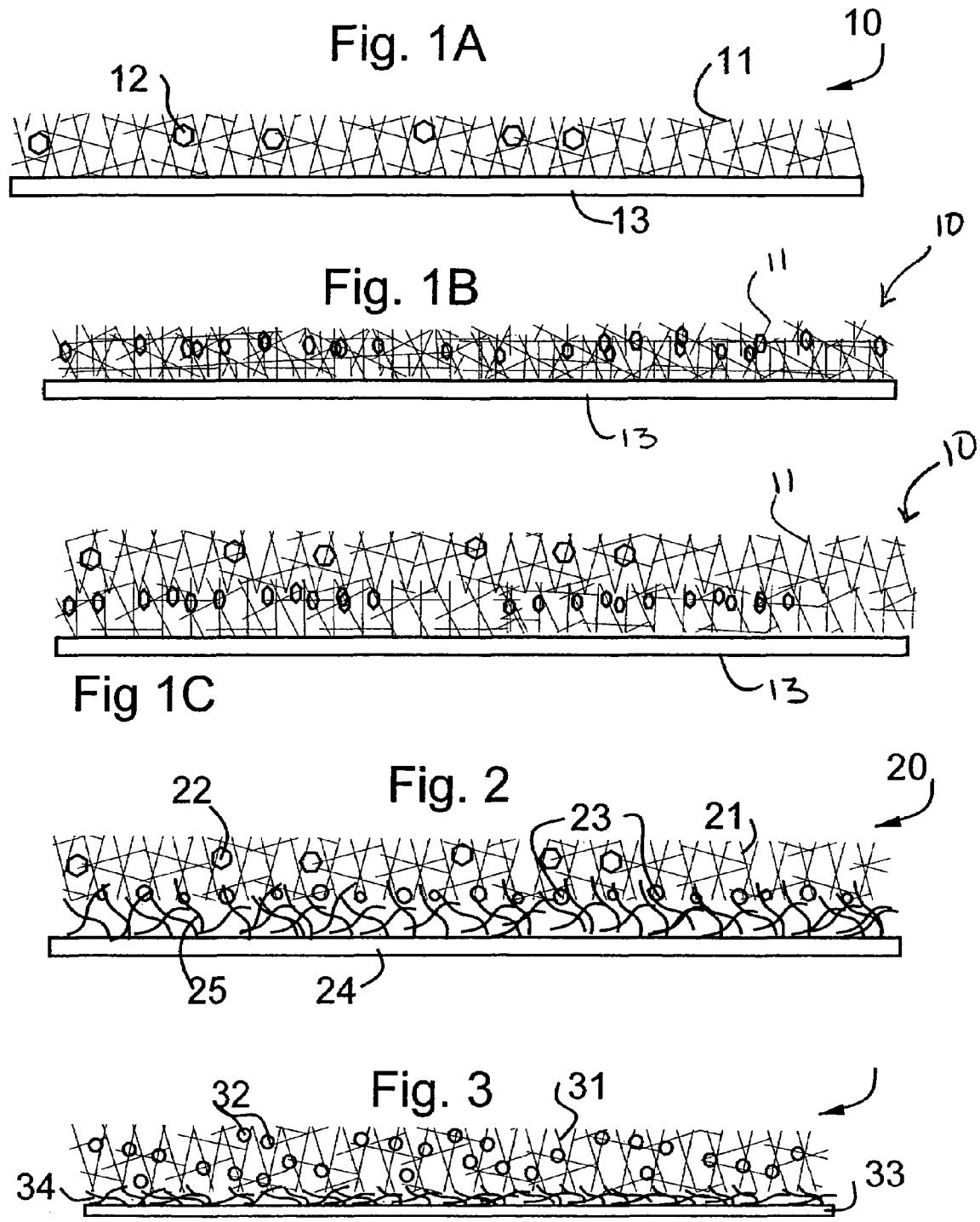

ABSORBENT PAD FOR ENTRAPPING SMALL AND LARGE PARTICLES, RETAINING LIQUIDS AND ELIMINATING ODORS

CROSS-REFERENCE TO PRIOR PATENT APPLICATIONS

This application is a continuation-in-part of pending U.S. patent application Ser. No. 10/033,862, filed. Dec. 20, 2001, entitled Absorbent Pad for Entrapping Small and Large Particles, Retaining Liquids, and Eliminating Odors, the subject matter of which is incorporated herein by reference thereto as though recited in full.

FIELD OF THE INVENTION

The present invention is directed generally to a lightweight, absorbent, disposable pad, and particularly to a lightweight, absorbent, disposable pad comprised of non-woven fibers that entraps particles, retains liquid, and eliminates odors, and a method for manufacturing the same.

BACKGROUND OF INVENTION

Many pet, household, and commercial items require a pad for trapping stray particles, food particles, fur and dander, and/or excessive liquids, and preventing them from migrating and soiling other areas.

For example, many cat litter boxes cause litter particles to escape onto nearby floor surfaces. Some commercially available mats and artificial turf have been sold, which retail for $5.00 to $20.00, and are designed to trap litter. These mats are heavy and expensive. Artificial turf is avoided by many animals due to the sharp, crisp, stiff feel of the turf on their paws. Also, many pet food dishes for dogs and cats do not allow for absorbing spillage of liquids, drinking water, and soft and hard particles of food from these surfaces.

Many mats commercially sold for use around the home, such as dish rack drain mats, and entrance mats can be vastly improved in design, disposability, cleanliness, cost, cleaning ability, absorbency, and odor prevention by using the present invention as a substitute. There are multiple household needs that can be met by the present invention. For example, people with dirty shoes track soil, moisture, and odors into the home, workplace, and public buildings, and refrigerators need a means for absorbing odors and liquids. Additionally, many bathrooms contain soap dishes and bathtub mats that try to contain and absorb excessive soap, drippings, and moisture. Also, most garbage pails or kitchen pails have a need for absorbing leakage that causes odors, and many potted plants overflow when watered or leak soil outside of the pot. In the garage and commercial work place many items can produce dust or shavings from wood, metal, plastics, cardboard, etc. that escape onto and soil other surfaces. In the case of photocopy machines, printers, and other devices that use carbon particle cartridges, much of the dust falls to the floor and other surfaces when cleaning or replacing these items.

Absorbent materials for retaining and confining liquids are well known. Many naturally found materials are capable of confining liquids. Porous, absorbent clays and sands are commonly used in animal litters. Fibrous materials such as cotton and wood pulp are woven into absorbent pads and towels. Even straw is used for animal bedding and absorption or dispersion of wastes. Most of these materials have limitations on their absorbency and are incapable of controlling odors or capturing a variety of numerous heavy or fine particles efficiently.

Absorbent pads are conventionally used for a variety of commercial and industrial purposes. Such pads often are comprised of a liquid-permeable top sheet, a liquid-impermeable back sheet, and an absorbent layer containing a water absorbent resin and a fibrous material provided between the top and back sheets for absorbing and retaining a liquid. Such a pad for use with an animal litter box is described in U.S. Pat. No. 4,774,907 to Yananton. This pad is an improvement in rip-proof non-woven screens for use in combination with a sorbent padding, a liquid impermeable liner, a litter container and litter.

Many different types of media have been used as animal litters for disposing of liquid and solid waste. Among the more popular are clays, wood chip, cedar, alfalfa, corncob, newspaper, and the clumping clay based cat litters that contain silica.

SUMMARY OF THE INVENTION

The instant invention is directed to a multiple-use, absorbent, particle-catching pad made of a non-woven fabric having open ends, closed-loop ends, or a combination of open and closed-loop ends. The structure of the pad preferably includes a plastic impermeable bottom layer and a high loft, filamentous, non-woven top layer. The middle layer, when used in certain absorbent applications, consists of wood pulp, plain or treated With super absorbent polymers, baking soda, anti-microbials or odor-counteractive agents. The top layer can also be treated with the above to eliminate odors. Other substances such as cling enhancing or static enhancing substances can be added to a portion or all of the top layer so as to enhance particle entrapment by enhancing the cling of the top non-woven material. In other embodiments, the non-woven material is replaced by other porous material, and in still other embodiments, the bottom layer is made from the same liquid permeable material as the top layer.

An absorbing agent having excellent liquid absorption rate and planar diffusion and a good surface dry feeling, and an absorbent material that uses the absorbing agent can be added to the pad of the present invention. The absorbing agent eliminates the risk of leakage even when used for a long time or used for a thin absorbent material including a high ratio of a water absorbent resin.

The open-ended, fibrous pads of the present invention are manufactured by cutting close-looped non-woven fibers and abrading the cut surface to create the open-ended non-woven surface that can easily catch and trap particles. The pads are manufactured easily and inexpensively, are durable, and can be treated with or contain additional odor-counteractive agents, baking soda, silica particles, super absorbent polymers, or combinations of all of the above, as well as oils and antibacterials of all natures to enhance the absorbency of particle-entrapping nature of the pad. Pads can be manufactured as strict particle entrapping, two-layered pads, or absorbent liquid particle trapping three-layer pads.

DESCRIPTION OF THE FIGURES

FIG. 1A is a side view of a two-layer particle-entrapping open-ended non-woven pad designed for large particles.

FIG. 1B is a side view of a two-layer particle-entrapping open-ended non-woven pad designed for small particles.

FIG. 1C is a side view of a two-layer, particle-entrapping, combination open and closed end non-woven pad designed for small and large particles.

FIG. 2 is a side view of a three-layer particle-entrapping open-ended non-woven pad designed for small and course particles and for liquid absorbency.

FIG. 3 is a side view of an open-ended non-woven kitty litter pad comprising a three-layer particle-entrapping, liquid-absorbing pad containing litter within the non-woven top layer.

DETAILED DESCRIPTION OF THE INVENTION

Figure 4:
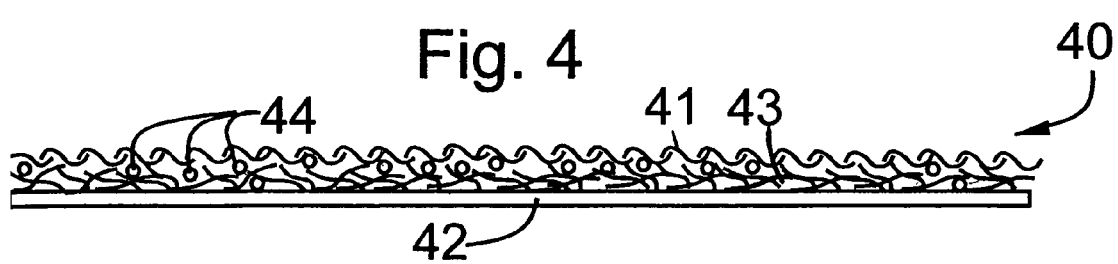
FIG. 4 is a side view of a moisture-trapping closed-end non-woven pad for household or commercial use.

The instant invention is a combination particle entrapping, liquid absorbing and odor-reducing pad for use in home, industrial, and clinical situations. The pad is similar in design to that described in U.S. Pat. No. 4,774,907 to Yananton, which is incorporated herein by reference as though reproduced in its entirety.

The pad includes at least a top layer and a bottom impervious layer. Optionally, the pad can include a middle absorbent layer. FIG. 1A shows one embodiment of a two layer particle-entrapping pad 10 for large, coarse particles such as, but not limited to, food crumbs, hair and wood chips/shavings, etc. In order to entrap these large particles, the top layer must preferably be an open-ended non-woven material. The high loft open-ended non-woven top layer 11 is secured to a plastic liquid impervious bottom layer 13. Top layer 11 traps larger particles 12. Once the particles 12 are trapped within the non-woven, they either fall to the bottom of the pad 10 or remain suspended within the top layer 11. FIG. 1B shows a two layer particle-entrapping pad for small, fine particles such as, but not limited to, dust, dander, fine food crumbs, etc. for which the open-ended non-woven material is also efficient, though not necessary. The high loft non-woven top layer 11 is secured to a plastic liquid impervious bottom layer 13. Small particles 14 are trapped in the non-woven layer 11. In the embodiments of either FIG. 1A or 1B, cling enhancing additives can increase the holding capacity of the top layer 11, or static charge for additional cling can be maintained by the composition of the fibers or added cling enhancing ingredients. Additionally, deodorants such as baking soda can be added or pre-loaded to either top layer 11 or between layers 11 and 13.

Top layer 11 is made from a variety of high loft non-wovens as shown in FIGS. 1A and 1B. This top layer is used to entrap particles, and, therefore, the non-woven used depends on the kind of particles the user wants to entrap. The denier or density of top layer 11 non-woven can be varied or combined to trap and hold large particles as shown in FIG. 1A, small particles as shown in FIG. 1B, or both as shown in FIG. 1C. In order for coarse, large particles to fall within the non-woven, at least part of the non-woven layer must be open-ended as shown in FIG. 1C. This is not as critical to the entrapment of small particles, which will fall within either open or closed end non-wovens.

Bottom layer 13 is made of a plastic sheeting such as polyethylene or polypropylene. This layer will not allow liquid to pass through, protects surfaces below it from moisture, and acts as a supporting device for installation and disposal of the invention described. Adhesive strips, drawstrings, or elastic can be added to bottom layer 13 so as to make adherence to another surface or container more secure.

An optional middle layer can be incorporated into the pad as shown in FIG. 2 thereby creating a three-layer pad 20 with the ability to trap small and large particles and to absorb liquids for evaporation or convenient sequestration. A high loft, non-woven top layer 21 is secured to a plastic liquid impervious bottom layer 24. A fiber 25 with super absorbent polymer serves as an intermediate layer to increase both particle trapping and liquid retention. Course particles 22 and small particles 23 are trapped in the non-woven layer 21, while liquids that flow through the middle fiber 25 are stopped at the impervious bottom layer 24.

Absorbent middle layer 25 is made of wood pulp or fluff by itself or enhanced with super absorbent polymer. To middle layer 25 baking soda, a super absorbent polymer or silica gel, antibacterial agents, or anti-fungal agents can be added. The middle layer 25 can even consist of almost pure baking soda or silica gel trapped between the top layer and impervious bottom layer. Absorbent middle layer 25 is used in embodiments wherein the use of the pad is liquid absorption.

A preferred embodiment of the present invention provides an absorbent pad comprising a liquid-permeable top layer, a liquid-impermeable bottom layer, and an absorbent middle layer provided between the top and bottom layers, wherein the absorbent middle layer comprises the above mentioned water absorbing agent and preferably a non-woven. A non-absorbent high-loft, at least partially open-ended non-woven, which can capture large or small particles, is attached to the impervious bottom layer by cold glue or hot-melt glue. This non-woven is useful to distribute the moisture and reduce the quantity of absorbent material required. A silica gel having excellent absorption rate of a liquid and planar diffusion with a good surface dry feeling without the risk of leakage even when used for a long time combined is the preferred absorbing material.

For entrapping large and small particles, a variety of inert, non-absorbing high-loft non-wovens exists which can be used to retain the super absorbing polymer water absorbing material. Examples of this high-loft non-woven include polyester, nylon, polypropylene and the like and these can be manufactured in a variety of thicknesses and densities as may be desired by both user or needed for the use. The denier for these materials can range from thick with relatively sparse thread count to thin with very high thread count. They can be sprayed with a binding agent so as to join the fibers at the points of junction, or they can be needle punched to integrate the fibers. Union Wadding Inc. in Pawtucket, R.I. and Hollinee Filtration (now Ahlstrom Inc.) in Texas, as well as many other non-woven suppliers supply non-woven in all types of lengths, widths, etc. with or without binding agents or tacky materials applied. These anon-woven materials can be manufactured with a tacky material applied so as to allow easy integration of the absorbent polymer and/or silica absorbent material.

Non-wovens suitable for use with the present invention are typically manufactured in a closed-loop configuration. This closed-loop configuration provides for a closed end as shown in FIG. 4, which is efficient for entrapping small particles but inefficient for entrapping large particles. In order to efficiently entrap large particles, the non-woven must preferably have an open-ended configuration as shown in FIGS. 1A-3. In order to achieve this open-ended non-woven configuration, a typical closed-loop non-woven must be cut and abraded. Alternatively, closed-loop end non-wovens having very large spaces and less filaments can be used, but such materials are usually flimsy and rip easily. Accordingly, open-ended non-woven fibers are preferred for entrapping large particles.

A preferred method of manufacturing an open-ended non-woven is disclosed herein. First, as a high loft non-woven is extruded from the machine prior to final winding on a roll, it is subjected to a line of rotating blade wheels corresponding to the width of the extruded non-woven and cuts the entire length of the extruded non-woven. Preferably, each blade wheel is approximately every one-half inch apart from the wheel beside it, though other blade wheel configurations are acceptable. The depth of the cut produced by the blade wheels can vary, but is preferably at least three-quarters to one-half of the depth of the non-woven. This preferred depth will optimize the effects of particle entrapment.

Next, a second set of similar blades located down line of the first set traverses back and forth over the non-woven, thereby cutting at preferably ninety degree angles to the lengthwise cuts made by the first line of blade wheels. The depth of this second set of cuts is preferably the same depth as the first set of cuts. Finally, the cut surface of the non-woven is abraded with an abrading tool, thereby creating at least partially open-ends for entrapping large particles. The abrading tool is preferably a fine wire brush, though other tools such as steel toothed and ragged plastic brushes could be used. If the cut and abrasion process is repeated, more open ends will be produced.

By cutting and abrading the non-woven surface, the surface is pockmarked with large, rough, holes and cavities that capture and hold larger particles. The ability for large particles to track across the surface of the non-woven is greatly diminished to a point where the high loft material still holds onto these large particles when lifted at a 45 degree to almost 90 degree angle. Without cutting and abrading, the large particles slip across and fall off the surface if more than a 30 degree to 40 degree angle is applied. This is a preferred method of manufacturing open-ended non-wovens, though any method which cuts and abrades the loops of a non-woven could be used.

In a preferred non-woven construction, the top of the non-woven is open and the fibers are spread apart, allowing for rapid particle entrapment, while the further down the particles sink, the more dense the fibers are entangled, allowing for permanent entrapment. The base of the non-woven is relatively flat, allowing for the placement on the plastic impervious layers.

The middle non-woven layer can be made of fibers both short and long from wood pulp or fluff. This layer can also contain particles of silica, baking soda, activated carbon, or a super absorbent polymer to further aid in the absorption and evaporation associated with odor control.

The invention provides a use of the layered super absorbent pad in a variety of settings. In one embodiment, the pads are provided as an animal litter trap outside of litterboxes for cats, dogs, and other animals. The top layer allows liquids to pass but can be designed as claw proof and resistant to scratches. The pads can be used to protect against spills near the feeding areas or as an insert under or around litter boxes, animal crates, and birdcages.

Another preferred embodiment for cats is use as a kitty litter pad. FIG. 3 shows one embodiment of a litter pad wherein an impermeable bottom layer 33 is attached to a high-loft non-woven top layer 31 and having a middle absorbent layer 34 comprised of fluff or super absorbent polymer. In this embodiment the top layer 31 is impregnated with cat litter granules 32. The litter pad is a dry, prepackaged pad that is inserted into a cat litter box, thereby replacing the need for litter and liner. Cats, seeing the litter suspended in the pad, use it as they would ordinary litter. Urine becomes trapped in the litter within the top layer 31, falls down into the middle absorbent layer 34 where it dries out. This drying action prevents odors. The bottom layer 33 supports the other layers and prevents moisture from reaching the litter box. When the pad is soiled, the owner simply disposes of the entire pad and replaces it with a clean pad. The litter used in this design can be any litter.

In animal crates or birdcages, the pads can be placed underneath said crate to serve as a means for protecting against contamination and spreading of wastes. Alternatively, the pads can be placed within the crate with a covering placed on top of them. Using the pads in this fashion is particularly important in zoos, commercial boarding operations for pets, animal research labs and animal rescue operations where easy cleanup and waste containment to avoid odor and/or spread of disease is desired. The odor control capability of the absorbent material is particularly critical where various species of cats are housed as cat urine contains a high concentration of urea that is metabolized by bacteria to produce ammonia, a strong and noxious odorant.

In another embodiment, the pads can be used in household and commercial situations where fluids and particles are stored, removed and/or replaced in vehicles, appliances, office machines, vending machines and the like. The pads can be placed underneath said machine, appliance or vehicle to contain leaks and prevent spreading or contamination. Cleanup becomes easy and contamination is minimized, reducing the costs associated with these activities.

In another embodiment, the pads are produced with the high loft non-woven matrix and are used when toner is changed or added to photocopying machines. This embodiment prevents the toner from spreading over the surfaces of the copier and reduces or prevents contamination of the critical surfaces within the copier machinery.

In another embodiment, a layered pad is used as a mat—a floor mat or car mat. In this embodiment, a layered pad is provided comprising a bottom impervious layer of plastic and a top layer of a fibrous high loft non-woven capable of entrapping small or large particles. As particles form people and animals, footwear, metalwork, woodwork, copy machines and the like are generated, they immediately encounter the high loft non woven material which immediately immobilizes and entraps them, preventing them from scattering. The filament count of the non-woven material can be varied so as to increase the effectiveness of trapping small or larger particles. A cling enhancing substance can be optionally applied to the fibers to make them more sensitive to entrapping extremely small particles and hold them firmly to each fiber.

If absorbency is required, a layer of sorbent material can be optionally added between the bottom impervious layer and the top non-woven layer, whereby both particles and water are trapped by the various layers. For example, water and dirt from footwear can be trapped or wet food and water from a pet food dish can be trapped in this combination. Water is entrapped in the middle layer and prevented from flowing through onto surfaces by the impervious bottom layer while particles are retained by the top layer. Deodorants such as baking soda, antibacterial agents, anti-fungal agents, and any other odor-counteractive agent can be added to the pad of this embodiment. A pad used as a doormat or car mat can be used alone or easily attached over an existing mat using adhesive, elastic, or other attachment means. Pads used for doormats and car mats can be colored or decorative. Also, pads can be configured into a variety of sizes including floor runner sizes, preferably 6-8 feet long by 3 feet wide.

Household uses of the absorbent material include placement within houseplant containers to reduce spills due to over watering, placement within the drip pan underneath refrigerators to collect and retain condensed water, and use in bathrooms, kitchens, and laundry rooms to absorb liquid from persons, appliances, fixtures, and objects. Excess moisture buildup on objects within the household such as air conditioners, dishdrain mats, sinks, and thawing food, just to name a few, can be the cause of the buildup of bacteria, fungi, stains, and odors. These phenomena can be eliminated by the use of a three-layered pad that can entrap and evaporate moisture.

Whether the moisture build-up occurs underneath dish racks, flowerpots, potted plants, soap dishes, or coasters; by condensation on windows, pipes, or air conditioners; or by use of showers and bathtubs, the need for a device to catch, hold, absorb, lock in, or evaporate is the same. For these uses, an exemplary pad consists of a bottom impervious layer, absorbent desiccant middle layer and a top protective layer of preferably a non woven design to protect the layers below and allow the moisture to enter as liquid and exit as vapor. The middle layer can be made of short and long fibers from wood pulp or fluff. This layer can also contain particles of silica, baking soda, activated carbon, or super absorbent polymer to aid in the absorption and evaporation. Of particular note, pads used in bathrooms as bath mats can be treated with antibacterial and anti-fungal agents to prevent spread of germs and disease. This is especially useful in public wash facilities.

FIG. 4 shows one embodiment of a moisture-trapping pad for household or commercial use. An impermeable bottom layer 42 of polypropylene or equivalent is Attached to a fibrous layer 43 comprised of wood pulp fibers or fluff and a super absorbent polymer 44 which is then capped with a porous top layer 41 of either high loft non-woven or the non-woven described in U.S. Pat. No. 4,774,907 which allows liquids to pass through. Top layer 41 is shown in a closed end non-woven configuration since liquids and small particles can pass easily through. Liquids that pass through the top layer 41 are absorbed by the super absorbent polymer 44, and any excess liquids are prevented from pillage by the impervious bottom layer 42.

Another household use includes lining the bottoms of garbage pails, waste pails, commercial disposal pails, and other receptacles in order to provide protection from dripping waste and particles. Pads for this use may consist of similar construction as above or can be of a simpler structure, and may consist of similar construction as previously described in U.S. Pat. No. 4,374,907 to Yananton, omitting the particles catching high-loft non-woven layer, replacing it with a standard rip-proof spun bond or spun laced non-woven polypropylene, nylon or polyester sheet or any other similarly performing nonwoven. Silica gel, baking soda, super absorbent polymers, odor-counteractive agents, etc. can be added to the middle layer. The wood pulp fibers of the middle layer also promote evaporation to negate odors.

Figure 5A:
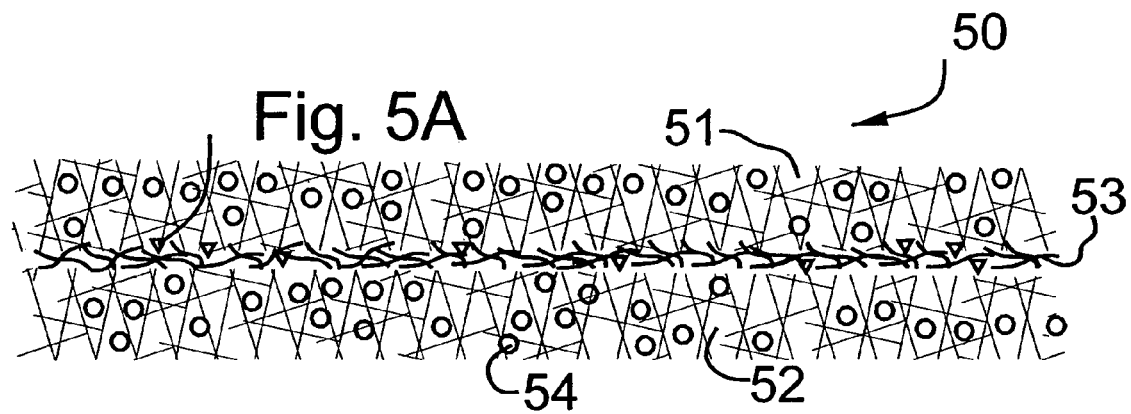
FIG. 5A is a side view of a moisture and odor-entrapping pouch having an open-end non-woven configuration.
Figure 5B:
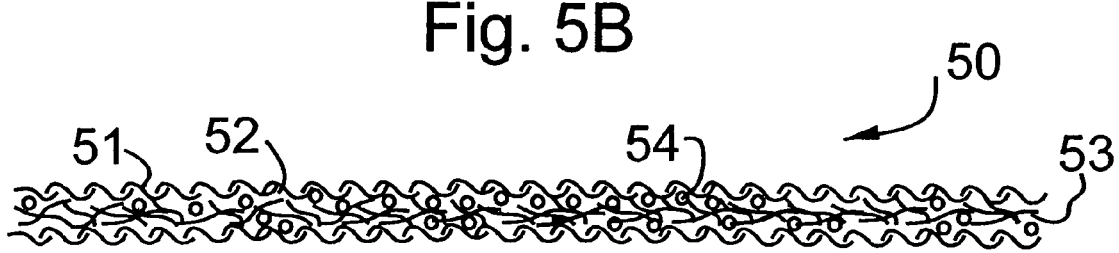
FIG. 5B is a side view of a moisture and odor-entrapping pouch having a closed-end non-woven configuration.

In another embodiment, as shown in FIGS. 5A and 5B, a pad can be developed as previously described wherein the bottom layer is the same as the non-woven top layer, i.e. there is no impervious bottom layer. These two non-woven layers 51 and 52 are attached to form kind of a pouch 50. The non-woven configuration of layers 51 and 52 of pouch 50 is not critical and can be open ended as shown in FIG. 5A or closed ended as shown in FIG. 5B. This pouch preferably contains a middle layer 53. Middle layer 53 can include a super absorbent polymer or backing soda particles 54 or both. This pouch 50 be used in any environment, most notably a refrigerator, to reduce odor and humidity.

With any of the embodiments, the edges of the pad can be sealed. Sealed edges would be especially useful in the litter pad and food pad embodiments. The edges would be sealed using any known sealing technique such as heat compression or hot melt glue.

The preceding examples and uses are provided for descriptive purposes solely and are not meant to limit the embodiments of the invention. Other configurations of the portable display case will become apparent to those of ordinary skill in the art.

What is claimed is:

1. A particle entrapment pad comprised of:
   at least an impervious bottom layer;
   a high loft, non-absorbent nonwoven top layer having a first surface and second surface, said high loft nonwoven being defined as a matrix or web of bonded fibers, and attached to said bottom layer;
   wherein at least said first surface of said non-woven top layer has a configuration for receiving at least small particles; and
   wherein said second surface of said non-woven top layer is attached to said bottom layer; and
   wherein at least a portion of said fibers are treated with a cling enhancing substance.

2. The pad of claim 1, further comprising a liquid-absorbing middle layer.

3. A particle entrapment pad of claim 1, wherein said inert cling substance is loaded with reactive particles.

4. The pad of claim 3, wherein said reactive particles are chemically reactive.

5. The particle entrapment pad of claim 1, wherein said cling enhancing substance is chemically inert and charged within said matrix or web.

6. The particle entrapment pad of claim 1, wherein said at least said first surface of said non-woven top layer is configured for receiving at least small particles by modifying said first surface of said non-woven top layer such as to enhance receiving and admission of particles into said matrix or web of bonded fibers to a greater level than before said non-woven top layer is so configured.

7. The particle entrapment pad of claim 6, wherein the altering of said matrix or web of bonded fibers structure is done by a mechanical device.

8. The particle entrapment pad of claim 7, wherein said mechanical device has a capability that is selected from the group comprising: cutting, widening, abrading, fissuring, tearing, and scraping.

9. A particle entrapment pad comprised of:
   at least an impervious bottom layer;
   a high loft non-woven top layer being defined as a matrix or web of bonded fibers and having a first surface and second surface,
   wherein at least said first surface of said non-woven top layer has a configuration for receiving at least small particles and wherein further said pad is a litter box pad to prevent the scatter of cat litter; and
   wherein said second surface of said non-woven top layer is attached to said bottom layer, wherein at least a portion of said second surface of said top layer is treated with a cling enhancing substance.

10. A particle entrapment pad comprised of:
   at least an impervious bottom layer;
   a high loft non-woven top layer being defined as a matrix or web of bonded fibers and having a first surface and second surface,
   wherein at least said first surface of said non-woven top layer has a configuration for receiving at least small particles and wherein further said pad is a pet food dish pad to catch food debris; and
   wherein said second surface of said non-woven top layer is attached to said bottom layer, wherein at least a portion of said second surface of said top layer is treated with a cling enhancing substance.

* * * * *